Nov. 26, 1940.  A. M. DUCRET ET AL  2,222,742
DEFROSTING GLASS PLATE AND METHOD FOR MANUFACTURING SAME
Filed July 6, 1938  2 Sheets-Sheet 1
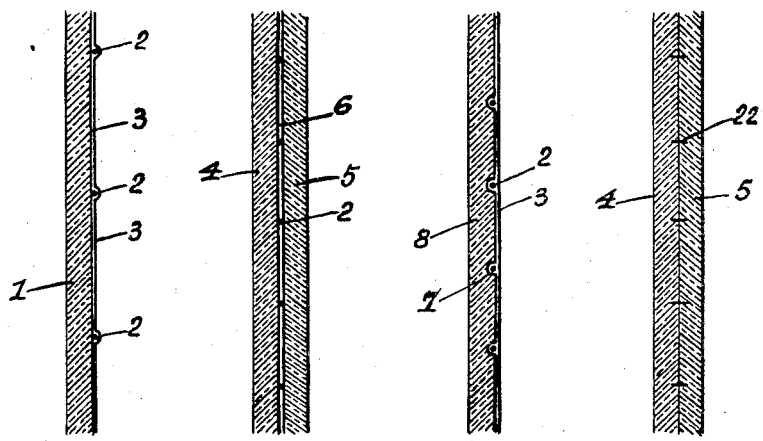
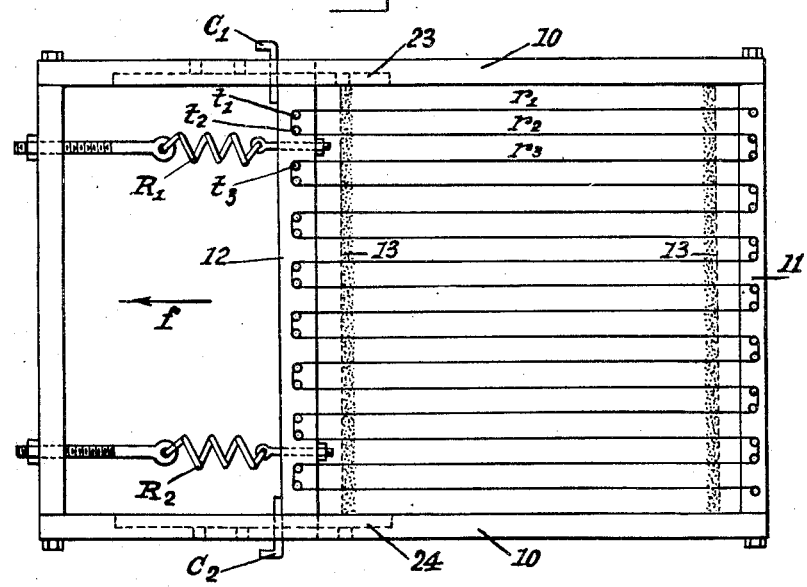
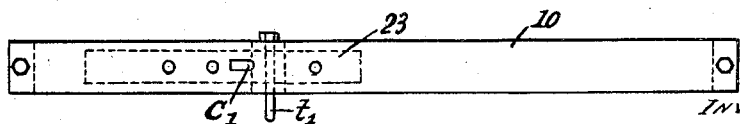
INVENTORS
A. M. Ducret and
J. R. Rideau
BY
ATTORNEY Nov. 26, 1940.   A. M. DUCRET ET AL   2,222,742
DEFROSTING GLASS PLATE AND METHOD FOR MANUFACTURING SAME
Filed July 6, 1938   2 Sheets-Sheet 2
Fig_7.
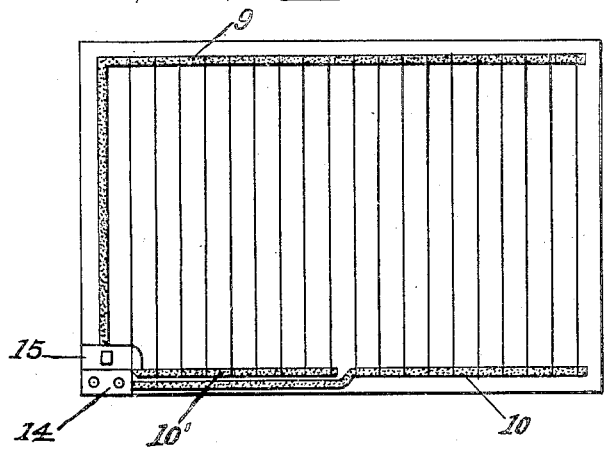
Fig_8.
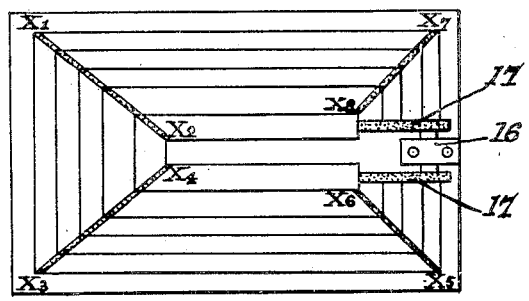
Fig_9.
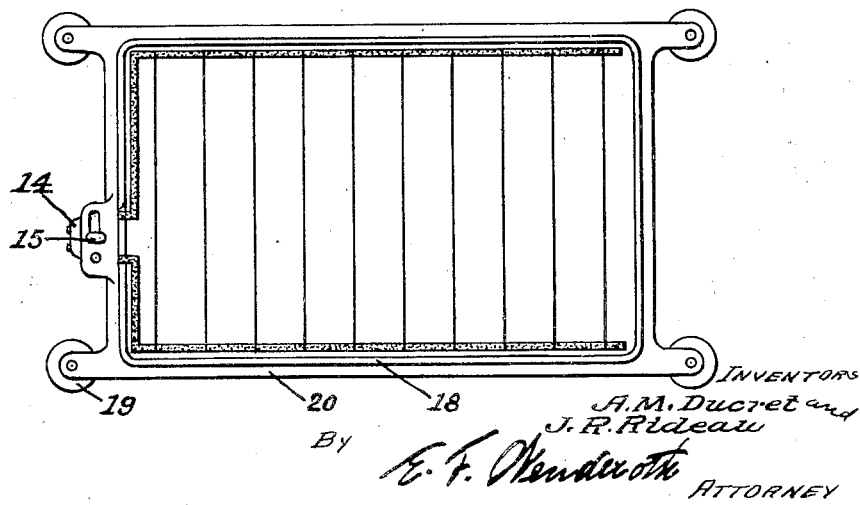
INVENTORS
A. M. Ducret and
J. R. Rideau
BY
E. F. Wenderoth
ATTORNEY Patented Nov. 26, 1940

2,222,742

UNITED STATES PATENT OFFICE 2,222,742

DEFROSTING GLASS PLATE AND METHOD FOR MANUFACTURING SAME

André Maxime Ducret and Jean Robert Rideau, Paris, France

Application July 8, 1938, Serial No. 217,800
In France July 15, 1937

4 Claims. (Cl. 219—19)

Defrosting glass plates have already been manufactured by arranging a series of heating wires, which are often of fairly large cross-section, between two glass plates which are spaced some distance apart: a rising current of hot air is thus created which, by convection, heats the visibility glass plate which is liable to frost. But the devices of this kind have various drawbacks: on the one hand, the heating is imperfect and lacks uniformity; on the other hand, it is found that the hot air which is set in motion deposits its dust on the glass no doubt owing to electrification phenomena.

The present invention consists in arranging fine electric resistance wires in intimate and close contact with the glass plate over their entire useful length, in such a manner that the glass plate is directly heated by conductivity.

Said fine wires, which are as numerous as necessary according to the magnitude of the rise of temperature to be effected, are spaced from 1 to 3 cm. apart according to cases and, owing to their small diameter, they do not in practice affect visibility.

They are preferably fixed at their ends by means of metallized strips which at the same time ensure the supply of the current.

Owing to its thermic conductivity, the glass itself ensures the uniform distribution of heat that is necessary for obtaining a uniform defrosting.

It is possible either to construct such a defrosting glass plate with a single thickness of glass, and in this case the conductors will preferably be arranged on the face which is opposite the ventilation and will be electrically and mechanically protected by a colourless varnish (sodium silicate, organic glass, cellulose, etc.); or with two thicknesses of glass, and in this case said conductors will advantageously be enveloped in an interstitial layer made of a solid, transparent substance which is a good conductor of heat (such as sodium silicate, organic glass, etc.) its being possible for said substance to serve at the same time for cementing the glass plates on each other.

The resistance wires may also be embedded in the thickness of the glass, either by forming suitable hollow grooves in the latter, or by sinking the wire into the glass in the hot state before said glass has hardened.

The invention furthermore includes a method for manufacturing glass plates of this kind which comprises stretching the wires beforehand on a frame, giving then the suitable pattern, placing the frame thus equipped on the pane, and fixing the useful parts on the glass plate, in particular by affixing a metallized layer, then cutting the ends of the wires and removing the frame.

By way of example and in order to enhance the comprehension of the present description, there have been shown in the accompanying drawings in:

Figures 1, 2, 3 and 4, sectional views of defrosting glass plates according to the present invention.

Figures 5 and 6, respectively plan and side elevational views of a frame for placing the stretched wires in position.

Figures 7 and 8, diagrammatical views of exemplary embodiments of defrosting glass plates according to the present invention.

Figure 9 the diagrammatical view of a removable defrosting glass plate.

In the exemplary embodiment shown in Figure 1, the wires 2 are placed on the surface of a pane or the like 1 made of glass or of any other appropriate transparent material and are fixed by a transparent and adherent coating 3.

In the example shown in Figure 2, they are on the contrary arranged between two panes 4 and 5 and the interstitial space is filled with a transparent and adherent material 6.

In the example shown in Figure 3, the wires are lodged in grooves 7 provided in the pane 8. Said grooves may in particular have been impressed in the glass during the manufacture of the pane, before it has completely cooled, or again, the wires themselves may have been driven by pressure into the vitrified mass before it has completely cooled.

In this latter example, the wires may be replaced by metal braid or strips of small thickness but of substantial width, placed edgewise. The example shown in Figure 4 illustrated the case of metal strips 22 embedded in the thickness of two juxtaposed panes.

In these various examples, the wires will preferably have a diameter of $3/100$ to $20/100$ of a millimetre; the braid or strips will have a similar thickness and a width of the order of 1 to 4 millimetres.

The fixing of the ends of the wires and the supply of same with current will be effected, according to the invention, by means of metallized strips obtained for example by projection of molten metal, such as the strips shown at 9 and 10 in Figure 7. Said strips may either be simply deposited on the actual surface of the pane, or be deposited in a groove formed in the thickness of the glass.

Instead of being obtained by projection of molten metal, said strips may be formed by flat pieces of metal on which the resistance wires are welded or fixed by any appropriate means.

It is rather difficult to obtain an efficient distribution of the resistance wires over the surface of the glass plates. For this purpose, according to the present invention, the following method may be employed:

The resistance wires $r_1$, $r_2$, $r_3$, etc. are stretched on the studs $t_1$, $t_2$, $t_3$ etc. carried by the crosspieces 11 and 12 of a frame 10 (Figures 5 and 6); the cross-piece 11 is fixed and the cross-piece 12, which can move in the guiding slide-ways 23 and 24 of the side members of the frame, is constantly drawn in the direction of the arrow $f$ by the tension springs $R_1 R_2$. While the wires are being placed in position said crosspiece is locked by the removable stops $C_1$ and $C_2$.

When all the wires $r_1 r_2 r_3$ etc. are mounted on the studs $t_1 t_2 t_3$ etc. the stops $C_1$ and $C_2$ are removed and the wires remain stretched.

The frame is then placed on the pane and the fixing of the wires is effected, for example by depositing by means of a metallizing pistol, the fixing and current supply strips represented by the hatched strips 13 of Figure 5. The ends of the wires are then cut and the frame may be removed.

The wires being thus fixed on the pane by their ends, the deposit is then effected of the protecting and fixing layer shown at 3 (Figures 1 and 3) or at 6 (Figure 2) and, if necessary, the second pane is affixed if the glass plate is formed by a double pane according to the example of Figure 2. Nothing then remains to be done but to complete the device by mounting plug sockets 14, switches 15 etc. (Figures 7, 8 and 9) at the starting point of the metallized strips.

For the wires metal braid or strips, any metals will be employed that are usually used for the manufacture of electric resistances, such as nickel, chromium, constantan, etc.

For the metallized or metal strips supplying the current, a good conducting metal will preferably be used, the coefficient of expansion of which is nearly that of glass.

The glass may be replaced by any transparent substance which is appropriate for manufacturing glass panes or plates.

The coatings or transparent interstitial layers may in particular be formed by sodium silicate, organic glass or any transparent organic materials which are capable of withstanding the temperature contemplated. The thermic conductivity of such materials is in general higher than that of glass, thereby offering an additional advantage for the efficient distribution of the heat.

The arrangement of the wires or strips may be very variable according to the purposes contemplated.

In the example shown in Figure 7 the surface of the glass plate is divided into two parts which can be supplied separately. The right hand part is supplied by the metallized strip 10 and the left hand part by the metallized strip 10'. Any appropriate switch 15 enables either of said parts to be heated, or both simultaneously.

In the example shown in Figure 8, the current from the plug 16 is distributed in the sheet of resistance wires by the metallized strips 17. Said wires are arranged in polygonal formations and the particular formations shown in this example enables a more intense heating to be obtained at the centre of the surface: very fine equipotential metallizations $r_1 x_2$—$r_3 x_4$—$r_5 x_6$—$r_7 x_8$, which are arranged along the points of change of direction of the wires, ensure the fixing of the wires to the glass.

Another embodiment, which is the object of Figure 9, consists in constructing the previously described heating unit on a glass plate of more reduced dimensions than those of the glass plate to be defrosted and in applying said heating unit externally or internally on the part to be heated. This removable device in this case comprises a frame 20 carrying fixing means such as suckers 19 and the plug socket 14 together with a switch 15. A rubber bead 18 ensures a certain amount of fluid-tightness for the space between the heating unit and the pane to be defrosted.

The invention can also be applied under the same conditions to non-transparent surfaces, in particular made of porcelain.

It covers, by way of new industrial products, the glass plates or elements of glass plates thus constructed and also the removable devices thus constructed which are intended to be fixed on the panes to be defrosted.

Having now particularly described and ascertained the nature of our said invention and in what manner the same is to be performed, we declare that what we claim is:

1. A defrosting plate comprising at least one transparent plate, a plurality of electrical conductor wires in tensioned state thereon, means for affixing said wires to said plate and for retaining them in said tensioned state, said means comprising a plurality of spaced adherent strips of metal deposited over an area of substantial width on one face of said plate and extending over said wires transversely of the latter, a layer of electrical non-conducting material covering the said wires and the said strips, and current supply means electrically connected to the said strips.

2. A defrosting plate comprising at least one transparent plate, a plurality of electrical conductor wires in tensioned state thereon, means for affixing said wires to said plate and for retaining them in said tensioned state, said means comprising a plurality of spaced adherent strips of metal deposited over an area of substantial width on one face of said plate and extending over said wires transversely of the latter, a layer of electrical non-conducting material covering the said wires and the said strips, and current supply means electrically connected to the said strips, the said layer of electrical non-conducting material consisting of a second transparent plate.

3. A defrosting plate comprising at least one transparent plate, a plurality of electrical conductor wires in tensioned state thereon, means for affixing said wires to said plate and for retaining them in said tensioned state, said means comprising a plurality of spaced adherent strips of metal deposited over an area of substantial width on one face of said plate and extending over said wires transversely of the latter, a layer of electrical non-conducting material covering the said wires and the said strips, and current supply means electrically connected to the said strips, the said strips being substantially spaced from the edges of the said plate.

4. A method for the manufacture of a defrosting plate including a supporting transparent plate, electric heating wires, and a metallic connection between said plate and wires, said method comprising arranging an electric heating wire to provide a plurality of substantially coextensive spaced parallel runs and connecting loops intermediate the several runs, tensioning said several runs by applying tensioning forces at said loops, maintaining said wire in the resultant tensioned state, applying said wire in the said state to a surface of said supporting plate, affixing said runs in tensioned state to said plate by depositing adherent metallic strips over said plate and runs transversely of and intermediate the ends of the latter, and at substantial distances from each other and from the edges of said plate, said strips being of substantial width, extending said metallic strips so that the ends thereof terminate adjacent an edge of said plate and in proximity to each other, whereby said ends may be readily associated with a source of current supply, then cutting the portions of said runs extending on the said strips, applying an insulating layer over the said runs and strips, and finally connecting the said strips with a current supply means.

ANDRÉ MAXIME DUCRET.
JEAN ROBERT RIDEAU.